United States Patent
Kuster et al.

(10) Patent No.: US 11,713,562 B1
(45) Date of Patent: Aug. 1, 2023

(54) BYPASS VALVE

(71) Applicants: Hans L. Kuster, Barrington, RI (US); Michael McNamara, Coventry, RI (US)

(72) Inventors: Hans L. Kuster, Barrington, RI (US); Michael McNamara, Coventry, RI (US)

(73) Assignee: AquaMotion, Inc., Barrington, RI (US)

( * ) Notice: Subject to any disclaimer, the term of this patent is extended or adjusted under 35 U.S.C. 154(b) by 393 days.

(21) Appl. No.: 17/036,708

(22) Filed: Sep. 29, 2020

Related U.S. Application Data (60) Provisional application No. 62/932,009, filed on Nov. 7, 2019.

(51) Int. Cl.
| | |
|---|---|
| *E03B 7/04* | (2006.01) |
| *E03B 7/09* | (2006.01) |
| *F16K 31/00* | (2006.01) |
| *F24D 17/00* | (2022.01) |
| *F16K 11/00* | (2006.01) |

(52) U.S. Cl.
CPC ............... *E03B 7/045* (2013.01); *E03B 7/09* (2013.01); *F16K 19/006* (2013.01); *F16K 31/002* (2013.01); *F24D 17/0078* (2013.01); *F24D 2220/0257* (2013.01)

(58) Field of Classification Search
CPC .......... E03B 7/045; E03B 7/09; F16K 19/006; F16K 31/002; F24D 7/0078; F24D 2220/0257
See application file for complete search history.

(56) References Cited

U.S. PATENT DOCUMENTS

| | | | |
|---|---|---|---|
| 7,971,601 B2 * | 7/2011 | Lum | G05D 23/134 |
| | | | 236/100 |
| 8,083,500 B1 | 12/2011 | Lebkuchner et al. | |
| 8,303,184 B1 | 11/2012 | Lebkuchner et al. | |
| 9,328,736 B2 | 5/2016 | Lebkuchner et al. | |
| 9,863,647 B1 | 1/2018 | McNamara et al. | |
| D834,145 S | 11/2018 | McNamara et al. | |
| 10,612,793 B1 | 4/2020 | Kuster et al. | |
| 2018/0002903 A1 * | 1/2018 | Stecewycz | E03B 1/048 |

* cited by examiner

*Primary Examiner* — Marc E Norman
(74) *Attorney, Agent, or Firm* — Salter & Michaelson (57) ABSTRACT

A bypass valve is for support between hot and cold water lines that connect to respective hot and cold fixtures. The bypass valve includes a valve body having an internal chamber, a hot water inlet port, a hot water outlet port and a discharge port; a bi-metal spring; a support member for mounting the bi-metal spring within the internal chamber of the valve body; and a shuttle mounted to the bi-metal spring and constructed and arranged to mate with the hot water inlet port in a closed position of the bi-metal spring. The bi-metal spring assumes an open position to disengage from the hot water inlet port at a predetermined water temperature to enable the hot water to discharge through the discharge port to the cold water line.

16 Claims, 8 Drawing Sheets

FIG. 7D

BYPASS VALVE

CROSS-REFERENCE TO RELATED APPLICATION

This application claims priority to U.S. Provisional Application Ser. No. 62/932,009 filed on Nov. 7, 2019 and which is incorporated by reference herein in its entirety.

FIELD OF THE INVENTION

The present invention relates in general to a bypass valve for use in home or industrial water distribution systems that supply water to various fixtures. More particularly, the present invention relates to bypass valves that are thermostatically controlled so as to automatically bypass water that is not at the desired temperature for use at the fixture. Even more particular, the present invention pertains to a thermostatically controlled bypass valve that employs a circulating pump.

BACKGROUND OF THE INVENTION

There presently exist bypass valve constructions that are meant to be installed under a bathroom or kitchen sink. Under sinks one normally finds two valves that are attached to pipes extending through the wall below the sink. The left side valve is normally connected to the hot water supply and the right side valve is normally connected to the cold water supply. These valves are also called angle stops because the water flow makes a turn in them from generally horizontal to vertical and when one closes these valves it stops the water flow to the sink fixture. Attached to these valves one finds hoses or pipes that connect to the sink fixture.

If no bypass valve is installed the water in the hot supply pipe over time will cool if the fixture is not opened so when one turns on the hot water faucet one has to wait for this cooled hot water to be emptied out of the line before hot water from the hot water source, either a hot water tank or tank-less water heater, reaches the sink fixture. During this waiting period water is being wasting as the cooled hot water in the line goes down the drain. To save this wasted water and the wait time, a bypass valve can be installed under the sink which maintains hot water to the fixture. There are several valves on the market today that do this and the present invention proposes an improvement in the bypass valve that uses a different technique to maintain hot water at the fixture.

The way these bypass valves work is they react to changes in the temperature of the water in the hot water supply line to the fixture. To do this they are installed between the hot water supply to the fixture and the cold water supply to the fixture. When one of these valves is installed a flow path is created that allows water from the hot water supply to the fixture to flow to the cold water supply to the fixture. This flow path is a loop since the cold water supply to the fixture is also the cold water supply to the hot water source (tank or tankless heater).

Simply connecting the hot and cold supplies may not maintain hot water at the fixture. A pump is used to establish a flow from the hot supply to the cold supply. Normally the pump is installed into either the hot water line that leaves the heating source or in the cold water supply line to the heating source. The pump can run continuously or intermittently based on time or demand. Any time the pump is running and the under-sink valve opens water flows through the bypass from the hot supply of the fixture into the cold water supply of the fixture. Another way flow is initiated is to open the hot or cold faucets at the fixture. When this happens water could flow through the bypass and either cold water would cross over to the hot water faucet or hot water would cross over to the cold water faucet. To keep cold water from crossing over when the hot water faucet is opened, a check valve is included in the bypass valve. This stops the flow of cold water to the hot water faucet.

Reference is made to commonly owned U.S. Pat. No. 9,863,647, which is hereby incorporated by reference in its entirety. The 9,863,647 patent describes a workable bypass valve embodiment that illustrates the valve as positioned on the hot water side of a fixture setup. For further background, if a larger pump is used with the arrangement shown in the 9,863,647 patent, the valve tends to flutter or thump during closing which pulsates, thereby causing pressure changes, as the valve approaches its closed position, this can cause undesirable noise and vibration.

Accordingly, it is an object of the present invention to provide an improved bypass valve that prevents the hot water from crossing over when the cold water faucet is opened. In accordance with the present invention, a bi-metal coil valve is used that closes the internal bypass port in the valve when hot water reaches the valve (coil).

Is it another object of the present invention to provide a bypass valve that can be incorporated into either the hot water side or the cold water side of the bypass line.

It is still another object of the present invention to reduce or minimize any noise and vibration in operation of the bypass valve.

SUMMARY OF THE INVENTION

Accordingly, there is now provided a water delivery system that includes hot and cold water lines that connect to respective hot and cold water fixtures and a bypass line, said hot water line including a hot water inlet pipe for receiving hot water from a hot water source and a hot water exit pipe that connects to the hot water fixture, said cold water line including a cold water inlet pipe for receiving cold water from a cold water source and a cold water exit pipe that connects to the cold water fixture, said bypass line including a bypass pipe that is connected between the hot and cold water lines and has one and other ends, and a bypass valve having a hot water inlet port that is connected to the hot water inlet pipe, a hot water exit port that is connected to the hot water exit pipe and a discharge port that is connected to the one end of the bypass pipe, said bypass valve further comprised of a valve body that defines an annular hollow internal chamber having a peripheral chamber wall, said hot water inlet port extending substantially tangentially of the peripheral chamber wall, said hot water exit port also extending substantially tangentially of the peripheral chamber wall, in line with said hot water inlet port and spaced about the peripheral chamber wall from said hot water inlet port, said bypass valve still further comprised of a bi-metal spring that is in the form of a center-mounted multiple coiled bi-metal spring having an outer free end, a support member for mounting the center of the bi-metal spring within the internal chamber of the valve body, and a shuttle mounted to the outer free end of the bi-metal spring and constructed and arranged to mate with the hot water inlet port in a closed position of the bi-metal spring, said bi-metal spring assuming an open position to disengage from the hot water inlet port at a predetermined water temperature to enable the hot water to enter the hot water inlet port, pass through the annular hollow internal chamber and then through to the cold water line.

In accordance with further aspects of the present invention, the bypass valve is arranged such that as water leaves the hot water inlet it expands and results in a pressure increase at the shuttle to cause the spring to move into the open position by pushing on the shuttle. The bi-metal coil can remain in the open position until the water within the chamber reaches the predetermined water temperature, which expands the coil and causes the shuttle to be biased closed. In the water delivery system, when water cools down below the predetermined water temperature, the coil begins to retract and the shuttle is biased open to let the hot water enter the annular hollow internal chamber. The water delivery system can further include a check valve positioned between an outlet of the chamber and the cold water supply line. The water delivery system can further include a check valve positioned between the hot water supply line and an inlet to the chamber. In the water delivery system, the hot water inlet port has a center axis, the hot water exit port also has a center axis and the center axis of the hot water inlet port is coincident with the center axis of the hot water exit port. The water delivery system can include a pump for establishing a flow between the hot and cold water lines. In the water delivery system, the hot water inlet extends in a direction that is orthogonal to the hot water inlet and exit ports, and the shuttle adjustably rotates circumferentially between open and closed positions of the bi-metal coil spring, said support member for the bi-metal coil spring comprising a center support post that is rotatable to adjust the rotational position of the bi-metal coil spring. In the hot water delivery system, the bi-metal spring is in the closed position when the water within the annular hollow internal chamber reaches the predetermined water temperature causing the coils of the bi-metal spring to expand, and wherein the bi-metal spring is arranged to disengage from the hot water inlet port into an open position when the water within the internal chamber reaches a second predetermined temperature causing the coils of the bi-metal spring to contract and thus disengage the shuttle from the hot water inlet port.

In accordance with the present invention there is also provided a bypass valve having a hot water inlet port that is connected to a hot water inlet pipe of a water delivery system, a hot water exit port that is connected to a hot water exit pipe of the water delivery system and a discharge port that is connected to the one end of a bypass pipe that is connected between the hot and cold water lines, said bypass valve further comprised of a valve body that defines an internal chamber having a peripheral chamber wall, said hot water inlet port extending substantially tangentially of the peripheral chamber wall, said hot water exit port also extending substantially tangentially of the peripheral chamber wall, in line with said hot water inlet port and spaced about the peripheral chamber wall from said hot water inlet port, said bypass valve still further comprised of a bi-metal spring that is in the form of a center-mounted multiple coiled bi-metal spring having an outer free end, a support member for mounting the center of the bi-metal spring within the internal chamber of the valve body, and a shuttle mounted to the outer free end of the bi-metal spring and constructed and arranged to mate with the hot water inlet port in a closed position of the bi-metal spring, said bi-metal spring assuming an open position to disengage from the hot water inlet port at a predetermined water temperature to enable the hot water to enter the hot water inlet port, pass through the annular hollow internal chamber, and then through to the cold water line.

In accordance with further aspects of the present invention the bypass valve can include a check valve positioned between an outlet of the chamber and the cold water supply line. The check valve can be positioned between the hot water supply line and the inlet to the chamber. In the bypass valve, the hot water inlet port has a center axis, the hot water exit port also has a center axis and the center axis of the hot water inlet port is coincident with the center axis of the hot water exit port. The bypass valve further includes a pump for establishing a flow between the hot and cold water lines. In the bypass valve, the hot water inlet extends in a direction that is orthogonal to the hot water inlet and exit ports, and the shuttle adjustably rotates circumferentially between open and closed positions of the bi-metal coil spring, said support member for the bi-metal coil spring comprising a center support post that is rotatable to adjust the rotational position of the bi-metal coil spring.

In accordance with the present invention there is also provided a bypass valve having a hot water inlet port that is connected to the hot water inlet pipe, a hot water exit port that is connected to the hot water exit pipe and a discharge port that is connected to the one end of the bypass pipe, said bypass valve further comprised of a valve body that defines an internal chamber having a peripheral chamber wall, said hot water inlet port extending substantially tangentially of the peripheral chamber wall, said hot water exit port also extending substantially tangentially of the peripheral chamber wall, in line with said hot water inlet port and spaced about the peripheral chamber wall from said hot water inlet port, said bypass valve still further comprised of a bi-metal spring that is in the form of a center-mounted multiple coiled bi-metal spring having an outer free end, a support member for mounting the center of the bi-metal spring within the internal chamber of the valve body, and a shuttle mounted to the outer free end of the bi-metal spring and constructed and arranged to mate with the hot water inlet port in a closed position of the bi-metal spring when water within the internal chamber reaches a first predetermined temperature causing coils of the bi-metal spring to expand, wherein the bi-metal spring is arranged to disengage from the hot water inlet port into an open position when the water within the internal chamber reaches a second predetermined temperature causing the coils of the bi-metal spring to contract and thus disengage the shuttle from the hot water inlet port.

In accordance with further aspects of the present invention, in the bypass valve, the first predetermined temperature is higher than the second predetermined temperature such that the spring engages with the hot water inlet port when the water reaches a higher temperature, and the spring disengages with the hot water inlet port when the water reaches a lower temperature. In the bypass valve, disengaging the spring from the hot water inlet port enables the hot water to enter the hot water inlet port, pass through the internal chamber, and then through to the cold water line. In the bypass valve, the insert extends in a direction that is orthogonal to the hot water inlet and exit ports, and the shuttle adjustably rotates circumferentially between open and closed positions of the bi-metal coil spring, said support member for the bi-metal coil spring comprising a center support post that is rotatable to adjust the rotational position of the bi-metal coil spring.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

Figure 1:
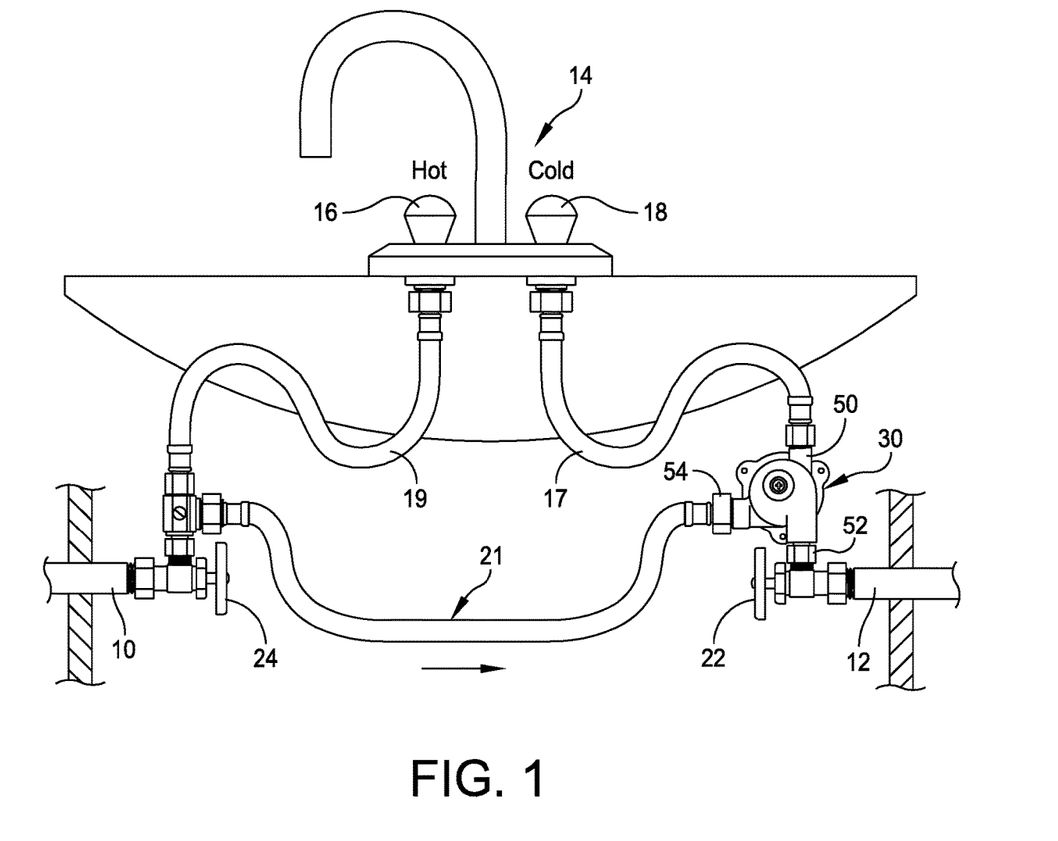
FIG. 1 is a schematic diagram of one embodiment of the use of a bypass valve in accordance with the present invention.
Figure 2:
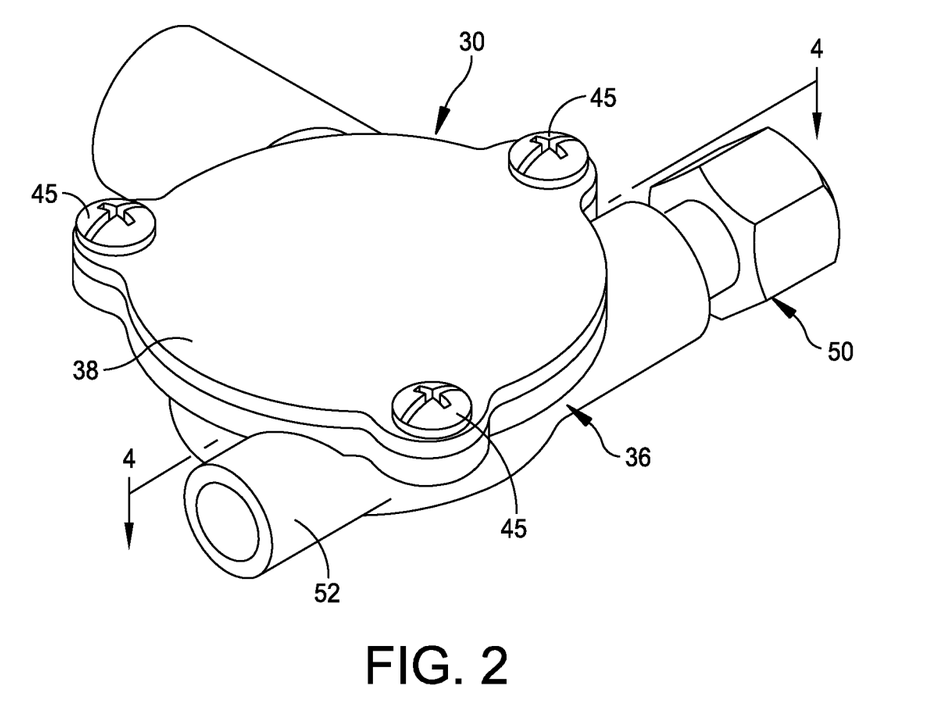
FIG. 2 is a perspective view of the bypass valve of FIG. 1.
Figures 5, 5A:
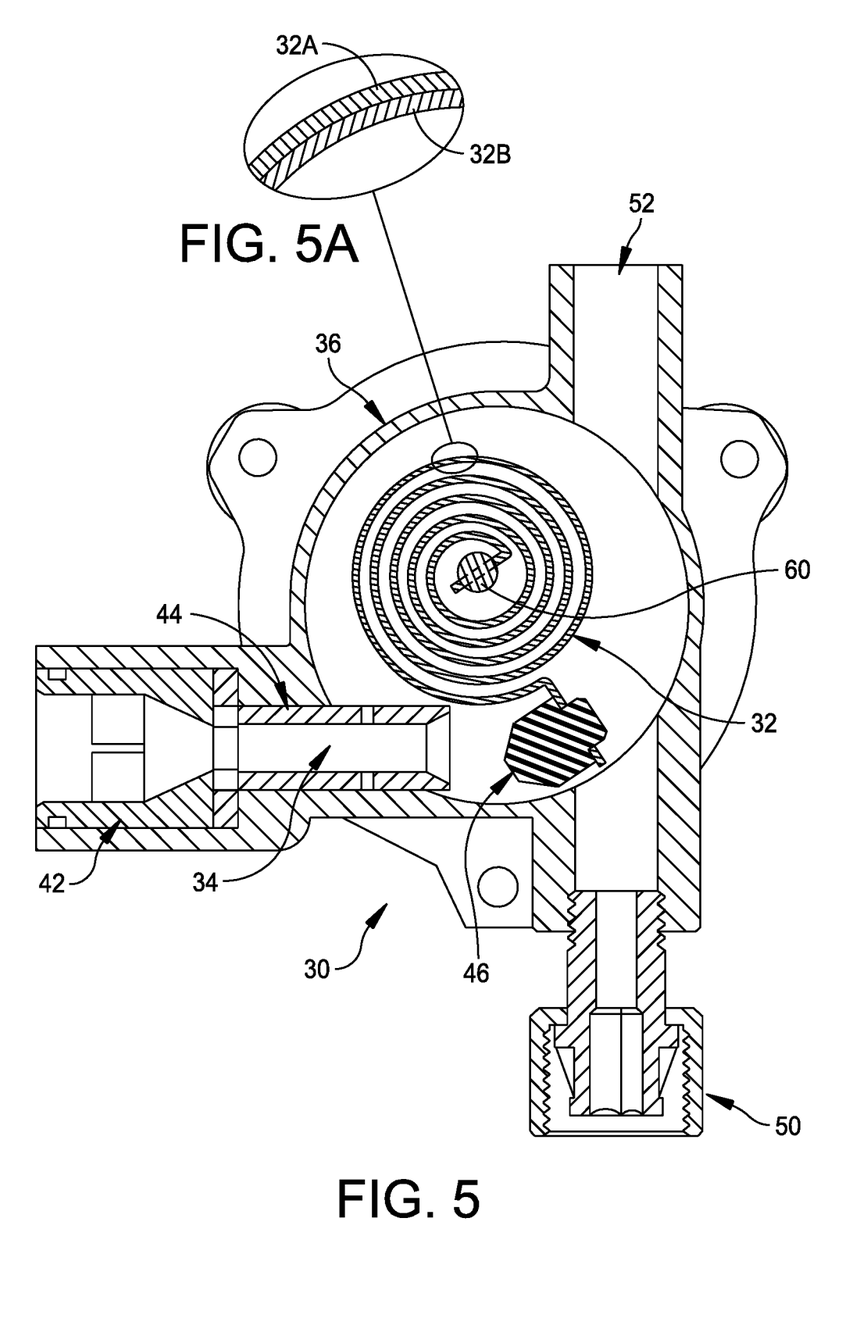
FIG. 5 is a cross-sectional view through the bypass valve of the present invention with the discharge port open.
FIG. 5A is a fragmentary view of the bi-metal feature of the coil.
Figure 6:
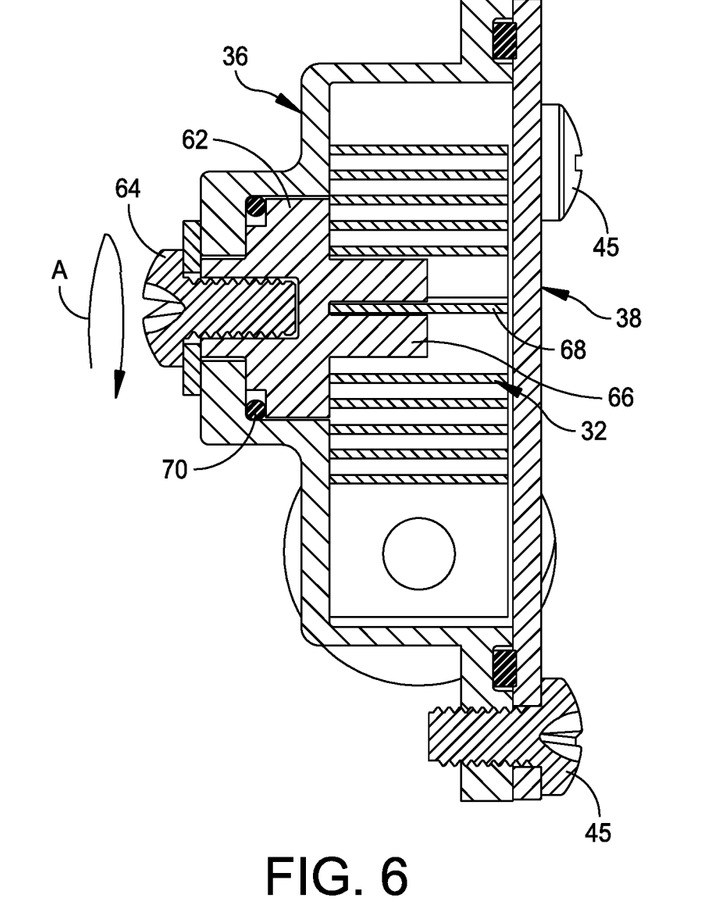
FIG. 6 is a cross-sectional view taken along line 6-6 of FIG. 4 showing further details of the adjustment feature of the bypass valve of the present invention.
Figure 7A:
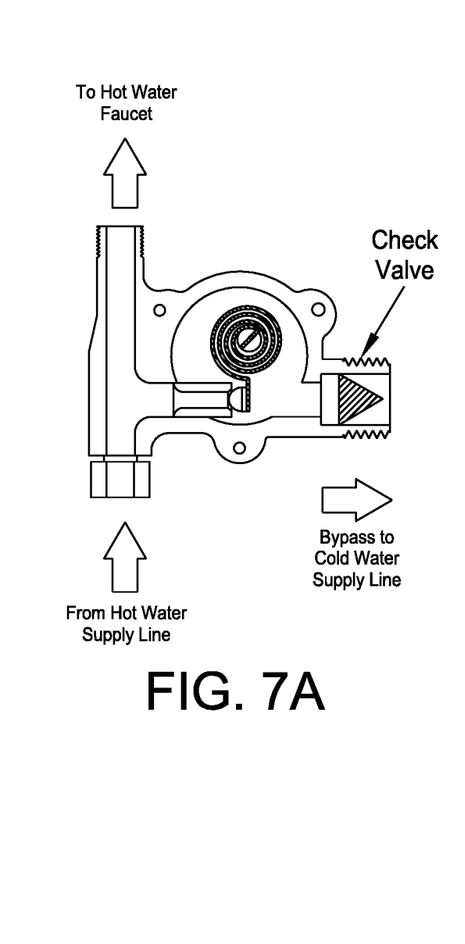
FIG. 7A is a cross-sectional view through the bypass valve in one example configuration of the check valve.
Figure 7B:
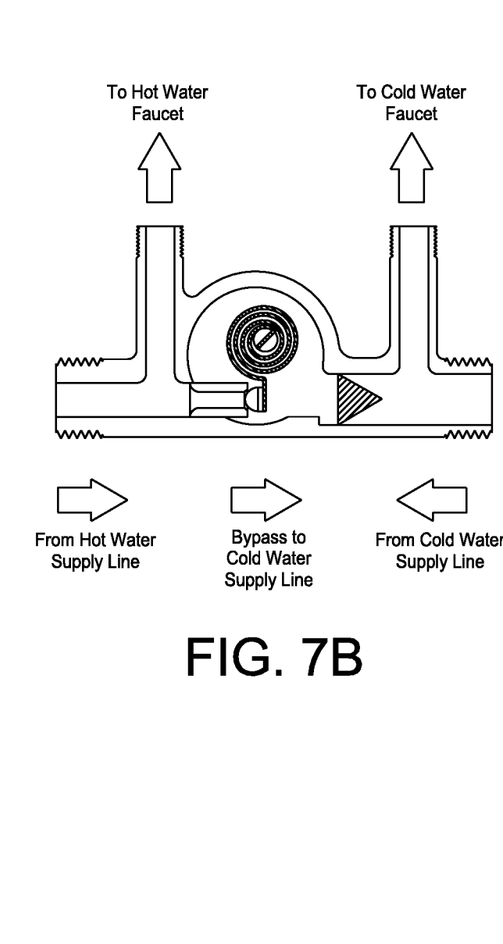
FIG. 7B is a cross-sectional view through the bypass valve according to another example configuration of the check valve.

Reference is now made FIGS. 1-6 for an illustration of one embodiment of the present invention. FIG. 1 in particular shows the basic water system with a hot water inlet at 10 and a cold water inlet at 12. The hot water inlet at 10 may be from a hot water heater or other source of heated water (not shown). FIG. 1 also depicts a typical fixture at 14 with respective hot and cold water faucets 16, 18. The system also typically includes turn-off valves 22 and 24 and interconnecting lines 17, 19. A bypass line is shown at 21 which is connected between the hot and cold water inlets. In the system diagram of FIG. 1 the bypass valve of the present invention is shown at 30 on the cold water side. As will be appreciated in light of the present disclosure, the valve may be positioned at the cold water side of the system, as shown in FIG. 1 (and also shown in FIG. 7C) or at the hot water side, for example as shown in FIG. 7A and 7B, or may be at any position within the bypass line.

Figure 4:
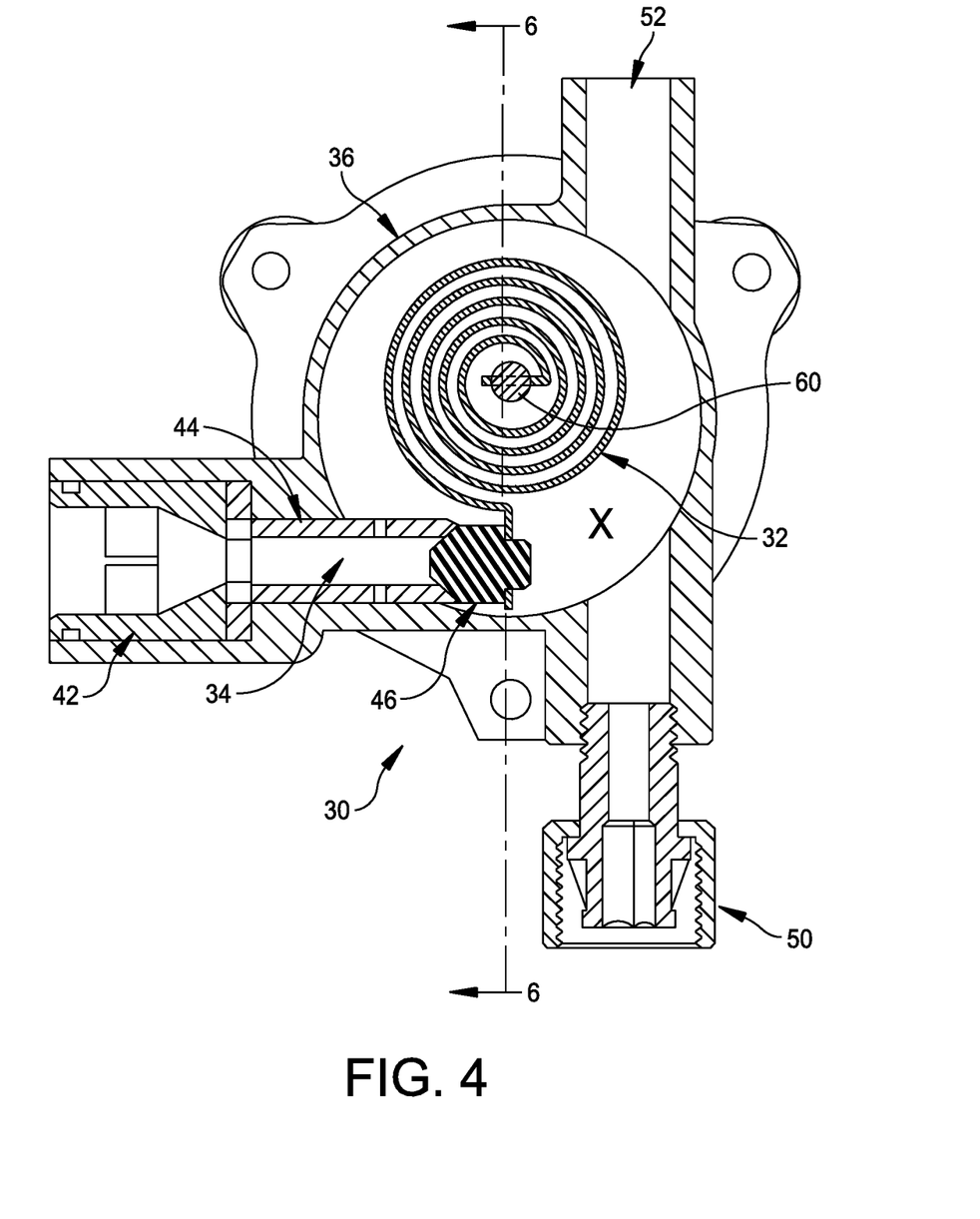
FIG. 4 is a cross-sectional view through the bypass valve of the present invention with the discharge port closed.

The improvement in accordance with the present invention is in the form of an under sink hot water bypass valve 30 that employs a bimetal coil 32 to open and close an inlet port 34 between the hot water and cold water supplies to a fixture to maintain a desired temperature range at the hot water faucet, which may be placed proximate the hot water side or the cold water side of the bypass line. Refer in particular to FIGS. 4 and 5. FIG. 4 is a cross-sectional view through the bypass valve 30 of the present invention with the inlet port closed while FIG. 5 is a cross-sectional view through the bypass valve 30 of the present invention with the inlet port open. The bi-metal coil 32 is illustrated in FIG. 5A as having separate, but connected sandwiched metal layers 32A and 32B that provide the bi-metal action of allowing the coil to essentially rotate between the positions shown in FIGS. 4 and 5 and dependent upon the temperature about the coil 32 caused by water flow past the coil 32.

Figure 3:
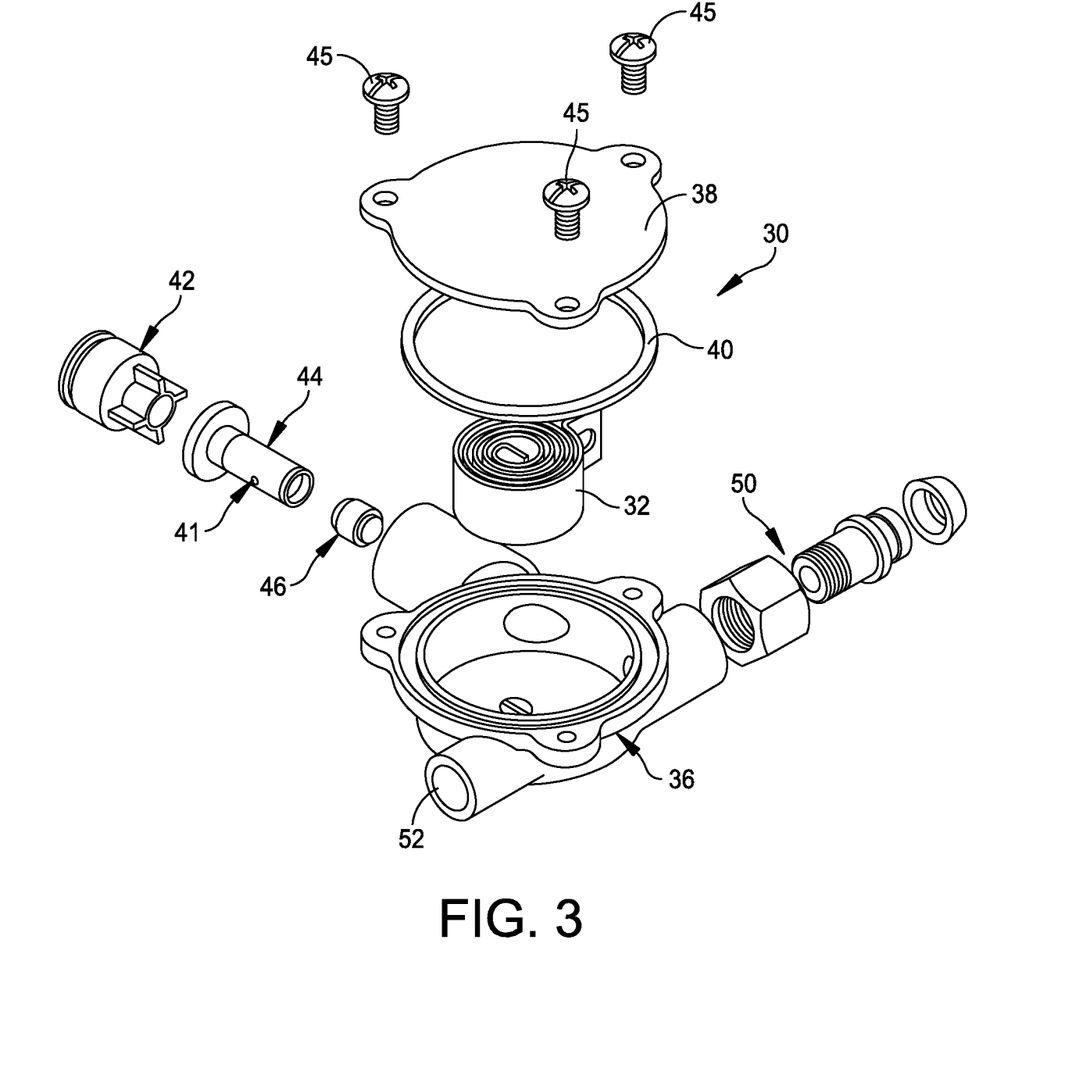
FIG. 3 is an exploded perspective view of the valve of FIG. 2 illustrating the various components that comprise the bypass valve of the present invention.
Figure 7C:
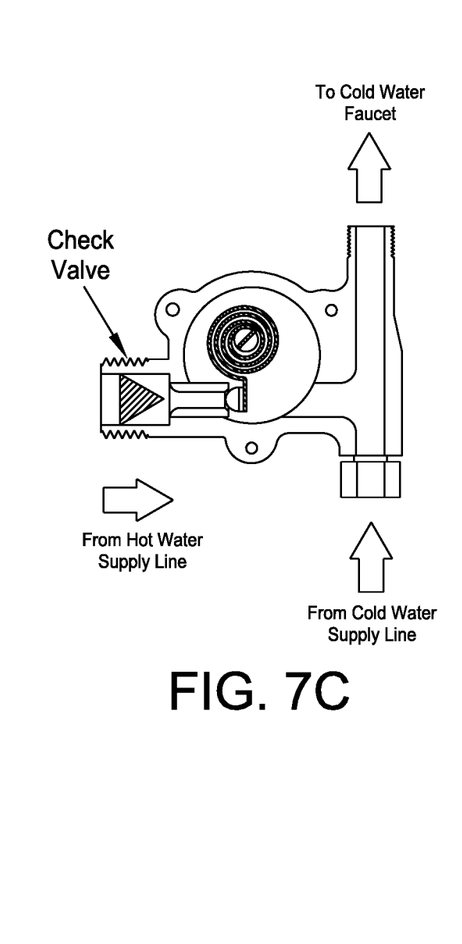
FIG. 7C is a cross-sectional view through the bypass valve according to still another example configuration of the check valve.

Reference is now made to the exploded perspective view of FIG. 3 where all the basic components that comprise the valve 30 are illustrated. This includes, in addition to the bimetal coil 32 to open and close the port 34, the valve housing 36, cover plate 38, gasket 40, check valve 42, valve insert 44 and shuttle 46. It is the shuttle 46 that actually opens and closes at the end of the insert 44 at port 34 as shown in FIGS. 4 and 5. Screws 45 are used to attach the cover plate 38 to the valve housing 36 with the gasket 40 being arranged between the cover plate 38 and the valve housing 36. Refer also to FIGS. 4 and 5 to illustrate the position of the check valve 42, valve insert 44 and shuttle 46 in the valve housing 36. Refer to FIGS. 7A-7C for various example placement and configurations of the check valve in accordance with the present disclosure.

The valve housing 36 has a cold water inlet port 52 from the cold water supply, a cold water exit port 50 to the cold fixture 18 and an inlet port 34 from the bypass line or the hot water supply line. The inlet port 54 may come from the bypass line, or if in the hot water line, may come from the hot water supply 10. The valve body is comprised of essentially one piece containing the ports and allows for insertion of the bimetal coil as illustrated in FIGS. 4-6. The action of the coil 32 opens the inlet port in the valve body at a preset temperature which allows water from the hot water supply (or bypass line water) to flow to the cold water supply when the water in the hot supply line cools to a preset temperature. This open position is illustrated in FIG. 5. When the temperature of the water in the valve body rises the coil expands closing the inlet port 34 and stopping the flow of hot water (or the bypass line) to the cold water supply. This closed position is illustrated in FIG. 4. When the temperature of the water in the valve body is between the preset opening and closing temperatures the inlet port 34 remains open and hot water that has cooled in the hot water supply flows to the cold water supply. To establish flow when water temperatures are between the preset opening and closing temperatures a pump in the hot water supply is operated. The shuttle 46 mounted to the outer free end of the bi-metal spring 32 and is constructed and arranged to mate with the hot water inlet port 34 in a closed position of the bi-metal spring (shown in FIG. 4). The bi-metal spring assumes an open position (shown in FIG. 5) to disengage from the hot water inlet port 34 at a predetermined water temperature to enable the hot water to enter the hot water inlet port, pass through the annular hollow internal chamber, and then through to the cold water line. The spring is normally in the open position and when the water at the coil reaches a predetermined heating temperature the coil expands, and thus the spring and associated shuttle are drawn to the closed position. The spring remains in the closed position until the water cools sufficiently to a second cooling temperature to retract the coil and thereby open the shuttle to allow the hot water to enter the bypass valve. The shuttle can be constructed and arranged to mate with the hot water inlet port in a closed position of the bi-metal spring when water within the internal chamber reaches a first predetermined temperature causing coils of the bi-metal spring to expand, wherein the bi-metal spring is arranged to disengage from the hot water inlet port into an open position when the water within the internal chamber reaches a second predetermined temperature causing the coils of the bi-metal spring to contract and thus disengage the shuttle from the hot water inlet port. The first predetermined temperature can, for example, be approximately 80-85 degrees Fahrenheit and the second predetermined temperature can, for example, be approximately 95-100 degrees Fahrenheit so that the valve is maintained at a temperature of approximately 85-95 degrees, such as 90 degrees Fahrenheit.

The check valve 42 incorporated in the inlet port of the valve body prevents the flow of water from the cold water supply to the hot water supply when hot water is called for at the hot water fixture. Refer to FIGS. 7A-7C for alternative example configurations of the check valve in accordance with the present disclosure.

A bypass 41 may be placed between the hot water supply (or the bypass line) and cold water inlet port in the valve body to equalize pressure on both sides of the valve. The opening and closing temperatures of the under sink valve may be adjustable to allow the factory or the end user to change the temperature at which the valve opens and/or closes. The under sink valve may be integral to the shut off valve (angle stop) for the fixture.

A support member is used for mounting the bi-metal coil spring 32 within an internal chamber of the valve body or housing 36. The inlet port is defined by the insert 44 that comprises an elongated post with a passage defining, at an internal end, the inlet port 34. The inlet port 34 can be the bypass line (e.g., FIGS. 3 and 6) or directly from the hot water line (e.g., FIGS. 7A-7C). The bi-metal spring 32 is a coil spring having a center portion for support from the support member which is illustrated in FIGS. 4 and 5 by a post 60. The bi-metal coil spring is arranged in multiple coil loops including an outer loop having a free end that supports the shuttle 46. The shuttle 46 may be constructed of a soft plastic or rubber material that fits well with the port 34 of the valve insert 44 when in the closed position as illustrated in FIG. 4.

Reference is now made to an adjustable version of the coil in order to adjust the temperature at which the shuttle opens or closes at the valve port 34. To provide this adjustment feature refer to FIG. 6 which illustrates a more complete version of the center support that includes a center post 62. In FIG. 6 the bi-metal coil spring 32 is rotationally adjustable to provide an adjustable temperature range as indicated by rotational arrow A in FIG. 6. This support includes, in addition to the post 62, a screw 64 that is mated with the post 62 which when tightened fixes the new setting of the support and coil. Rotation of the post 62 causes a circumferential rotation of the coil spring 32. The post 62 includes an inner piece 66 of smaller diameter than the post 62 and that engages with the center portion 68 of the coil spring 32. An O-ring seal 70 may also be provided between the post 62 and the housing 36 to form a seal. The post 62 adjusts the position of the coil by rotating the coil 32. In the position shown in FIG. 4 the coil 32 can be adjusted in alternate clockwise and counterclockwise directions to provide different opening temperatures. In FIG. 4 the adjustment would be clockwise to increase the shut off temperature set point.

The action of the coil spring and shuttle is such that the shuttle moves tangentially of the circular coil such as illustrated in FIG. 4. The insert 44 is thus disposed in that tangential direction as also noted in FIG. 4.

Reference is now made to FIGS. 7A through 7C for further descriptions and illustrations of the manner in which the bypass valve of the present invention can be incorporated into a typical hot/cold water system. FIG. 7A is a cross-sectional view through the bypass valve in one example configuration of the check valve. In this regard FIG. 7A shows the new coil, shuttle and insert configuration as mounted on the hot angle stop, along with the various flows to and from the valve. In FIG. 7A, the check valve is positioned between an outlet of the chamber and the cold water supply line. FIG. 7B is a cross-sectional view through the bypass valve according to another example configuration of the check valve. FIG. 7B shows what the new configuration would look like if it were hung between a hose from the hot angle stop and a hose from the cold angle stop. In FIG. 7A, the check valve is positioned between an outlet of the chamber and the cold water supply line, according to another arrangement. FIG. 7C is a cross-sectional view through the bypass valve according to still another example configuration of the check valve. FIG. 7C shows how the new coil, shuttle and insert configuration would look if it were mounted on the cold angle stop and the various flows to and from the valve. In FIG. 7C, the check valve is positioned between the hot water supply line and the inlet to the chamber.

Figure 7D:
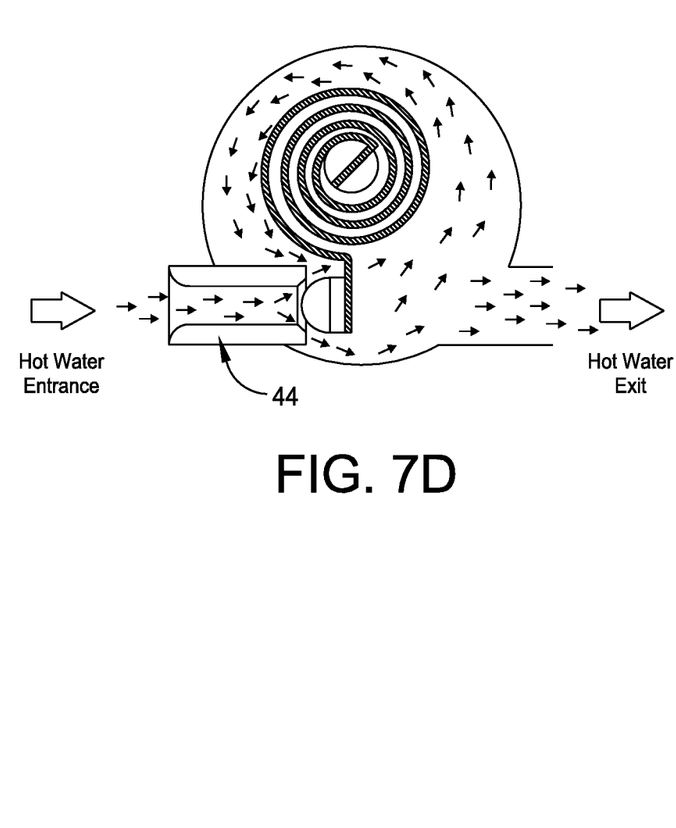
FIG. 7D is a cross-sectional view through the bypass valve according to the present disclosure, showing the flow of water therethrough.
Figure 7E:
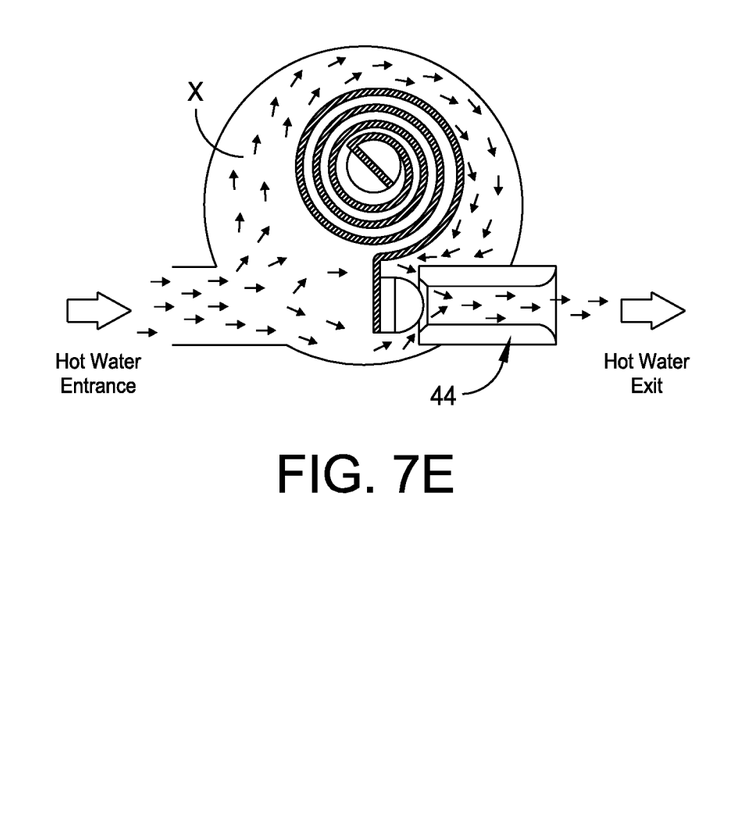
FIG. 7E is a cross-sectional view through a bypass valve according to the prior art, showing the flow of water therethrough.

FIG. 7D is a cross-sectional view through the bypass valve according to the present disclosure, showing the flow of water therethrough; and for comparisons purposes, FIG. 7E is a cross-sectional view through a bypass valve according to the prior art, showing the flow of water therethrough.

FIG. 7D shows the hot water flow path though the coil chamber with the new design. FIG. 7E shows the hot water flow path through the coil chamber according to a prior art design (e.g., the '647 patent). In FIG. 7D according to the present disclosure, note that the flow enters at the insert 44, which may come from the bypass line or the hot water input directly. As the water leaves the insert it expands which creates more static pressure, which results in a pressure increase, opening the spring. The larger area (denoted 'X' in FIG. 4) has low flow velocity, lower dynamic pressure, and higher static pressure. In comparison, in the valve in FIG. 7E it has the flow enter at the large area (X in FIG. 4). This is an area where there is low flow viscosity; lower dynamic pressure; and higher static pressure. The disadvantages of the embodiment of FIG. 7E is that it causes noise and vibration. As the water enters the insert 44 according to the embodiment of FIG. 7E, the water speeds up which converts static pressure to dynamic pressure, which results in a pressure drop. A low pressure area then occurs in the insert which pulls the shuttle closed. When it closes the low pressure area disappears and this can result in noise and vibration.

If one were to implement the structure of FIG. 7D instead of the embodiment of FIG. 7E, this prevents or at least minimizes this noise and vibration. The primary concept is to relocate the way in which the incoming hot water flow interacts with the valve construction. Rather than entering at the large area X (as shown in FIG. 7E according to the prior art valve techniques), the flow enters at the insert 44 (e.g., insert 44 of the inlet port 34 in FIGS. 1-6). Refer in particular to FIG. 7D and the flow arrows illustrating the flow entering at the insert. FIG. E shows the flow entering at the large are X (as shown in FIG. 4).

In the invention the valve is being pulled closed when the water is flowing by creating a low pressure. When it closes the flow is interrupted and the low pressure disappears. When this happens the strength of the coil takes over and reopens the valve. This cycle is then repeated until the coil reaches it set point (one can select a predetermined set point). A preferred set point is approximately 90 F. At this point the valve is open enough to maintain this temperature.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use. Expansion and contraction of the bi-metal coil when the temperature changes may be reversed by reversing the two metals of the coil.

What is claimed is:

1. A water delivery system that includes hot and cold water lines that connect to respective hot and cold water fixtures and a bypass line, said hot water line including a hot water inlet pipe for receiving hot water from a hot water source and a hot water exit pipe that connects to the hot water fixture, said cold water line including a cold water inlet pipe for receiving cold water from a cold water source, said bypass line including a bypass pipe that has respective one and other ends, and a bypass valve having a cold water inlet port that is connected to the cold water inlet pipe, a cold water exit port that is connected to the cold water fixture and a hot water discharge port that is connected to the one end of the bypass pipe, said bypass valve further comprised of a valve body that defines an internal chamber having a peripheral chamber wall, a center-mounted bi-metal spring that is disposed in the internal chamber and having an outer free end, and a shuttle mounted to the outer free end of the bi-metal spring and constructed and arranged to mate with the hot water discharge port in a closed position of the bi-metal spring, said bi-metal spring assuming an open position so that the shuttle disengages from the hot water discharge port at a predetermined water temperature to enable the hot water to enter the hot water discharge port and to the internal chamber.

2. The water delivery system of claim 1, wherein the internal chamber is defined by a peripheral chamber wall, said cold water inlet port extending substantially tangentially of the peripheral chamber wall, said hot water exit port also extending substantially tangentially of the peripheral chamber wall, in line with said hot water inlet port and spaced about the peripheral chamber wall from said hot water discharge port.

3. The water delivery system of claim 1, wherein the bypass valve is arranged such that as water leaves the hot water inlet it expands and results in a pressure increase at the shuttle to cause the spring to move into the open position by pushing on the shuttle.

4. The water delivery system of claim 1, wherein the bi-metal coil remains in the open position until the water within the internal chamber reaches the predetermined water temperature, which expands the bi-metal spring and causes the shuttle to be biased closed.

5. The water delivery system of claim 4, wherein, when water cools down below the predetermined water temperature, the coil begins to retract and the shuttle is biased open to let the hot water enter the annular hollow internal chamber.

6. The water delivery system of claim 5, wherein the coiled bi-metal spring has multiple coils.

7. The water delivery system of claim 1, wherein the bi-metal spring comprises a coiled spring.

8. The water delivery system of claim 1, further comprising a check valve positioned within the hot water discharge port.

9. The water delivery system of claim 1, further comprising a check valve positioned between the hot water supply line and the internal chamber.

10. The water delivery system of claim 1, wherein the hot water inlet port has a center axis, the hot water exit port also has a center axis and the center axis of the hot water inlet port is coincident with the center axis of the hot water exit port.

11. The water delivery system of claim 1, further including a pump for establishing a flow between the hot and cold water lines.

12. The water delivery system of claim 1, wherein the hot water discharge port extends in a direction that is orthogonal to the hot water inlet and exit ports.

13. The water delivery system of claim 12 wherein the shuttle adjustably rotates circumferentially between open and closed positions of the bi-metal coil spring.

14. The water delivery system of claim 13 wherein the bi-metal spring is supported by a center support post that is rotatable to adjust the rotational position of the bi-metal spring.

15. The hot water delivery system of claim 1, wherein the bi-metal spring is in the closed position when the water within the internal chamber reaches a predetermined water temperature causing the coils of the bi-metal spring to expand, and wherein the bi-metal spring is arranged to disengage from the hot water discharge port into an open position when the water within the internal chamber reaches a second predetermined temperature causing the coils of the bi-metal spring to contract and thus disengage the shuttle from the hot water discharge port.

16. The hot water delivery system of claim 1 wherein, in the open position, the hot water enters the hot water discharge port and passes through the internal chamber to the cold water line.

* * * * *